United States Patent [19]

Ivey et al.

[11] Patent Number: 4,911,682
[45] Date of Patent: Mar. 27, 1990

[54] CAMBERED PIN CVT CHAIN BELT

[75] Inventors: John S. Ivey, Ithaca; Paul M. Bateman, Freeville; Julius A. Clauss; Edward H. Cole, Jr., both of Ithaca; Philip J. Mott, Dryden, all of N.Y.

[73] Assignee: Borg-Warner Automotive, Inc., Troy, Mich.

[21] Appl. No.: 356,617

[22] Filed: May 23, 1989

Related U.S. Application Data

[63] Continuation of Ser. No. 114,335, Oct. 28, 1987, abandoned.

[51] Int. Cl.[4] .............................................. F16G 1/21
[52] U.S. Cl. .................................... 474/245; 474/215
[58] Field of Search ................ 474/201, 245, 215–217, 474/242, 237, 244

[56] References Cited

U.S. PATENT DOCUMENTS

| | | | |
|---|---|---|---|
| 1,561,676 | 11/1925 | Wertman | 474/215 |
| 1,563,065 | 11/1925 | Belcher | 474/215 |
| 1,734,688 | 11/1929 | Morse | 474/213 |
| 2,047,833 | 7/1936 | Pierce | 474/217 |
| 2,067,243 | 1/1937 | Perry | 474/215 |
| 2,096,061 | 10/1937 | Perry | 474/242 |
| 2,223,314 | 11/1940 | Cumfer | 474/213 X |
| 2,324,640 | 7/1943 | Perry | 474/215 |
| 2,651,211 | 9/1953 | Karig | 474/243 |
| 4,313,730 | 2/1982 | Cole, Jr. et al. | 474/201 |
| 4,386,921 | 6/1983 | Roberts | 474/201 |
| 4,386,922 | 6/1983 | Ivey | 474/242 |
| 4,392,843 | 7/1983 | Smit | 474/245 |
| 4,464,152 | 8/1984 | Kern | 474/245 |
| 4,498,892 | 2/1985 | Huntley | 474/242 |
| 4,507,106 | 3/1985 | Cole, Jr. | 474/215 |
| 4,512,754 | 4/1985 | Cole, Jr. et al. | 474/245 |
| 4,516,963 | 5/1985 | Mott | 474/245 |
| 4,516,964 | 5/1985 | Laster | 474/245 |
| 4,516,965 | 5/1985 | Mott | 474/245 |
| 4,526,559 | 7/1985 | Smirl | 474/245 |
| 4,526,560 | 7/1985 | Swain | 474/201 |
| 4,547,182 | 10/1985 | Rattunde | 474/214 |
| 4,553,953 | 11/1985 | Bock | 474/242 |
| 4,569,671 | 2/1986 | Ledvina | 474/201 |
| 4,580,999 | 4/1986 | Ledford | 474/201 |
| 4,581,000 | 4/1986 | Ferfecki | 474/201 |
| 4,622,025 | 11/1986 | Kern et al. | 474/201 |
| 4,645,479 | 2/1987 | Bateman et al. | 474/245 |
| 4,650,445 | 3/1987 | Mott | 474/242 |
| 4,692,130 | 9/1987 | Novak | 474/201 |
| 4,708,701 | 11/1987 | Cole, Jr. | 474/201 |
| 4,710,154 | 12/1987 | Rattunde | 474/215 |
| 4,718,880 | 1/1988 | Zimmer | 474/245 |
| 4,738,654 | 4/1988 | Cole, Jr. | 474/201 |
| 4,764,158 | 8/1988 | Honda et al. | 474/212 |

*Primary Examiner*—Thuy M. Bui
*Attorney, Agent, or Firm*—James A. Geppert; James J. Jennings

[57] ABSTRACT

A chain-belt for engagement with the pulleys of a continuously variable transmission consists of interleaved sets of chain links joined for articulation by a joint which has a rocking action. The joint includes a pair of pins. A small camber is introduced into one or both of the pins to create a spring load between the pins and the links to retain the pins in the chain during handling and assembly. Each chain link includes a pair of spaced apertures adjacent the opposite ends; each aperture has a generally hour-glass shape with the enlarged ends receiving the pins. Also, each chain link has a pair of oppositely disposed tabs adjacent one end with the location of the tabs on the links alternating on adjacent links of each set. In addition the outermost two links of each set of links has a width substantially less than the width of the inner links in that same set.

36 Claims, 2 Drawing Sheets

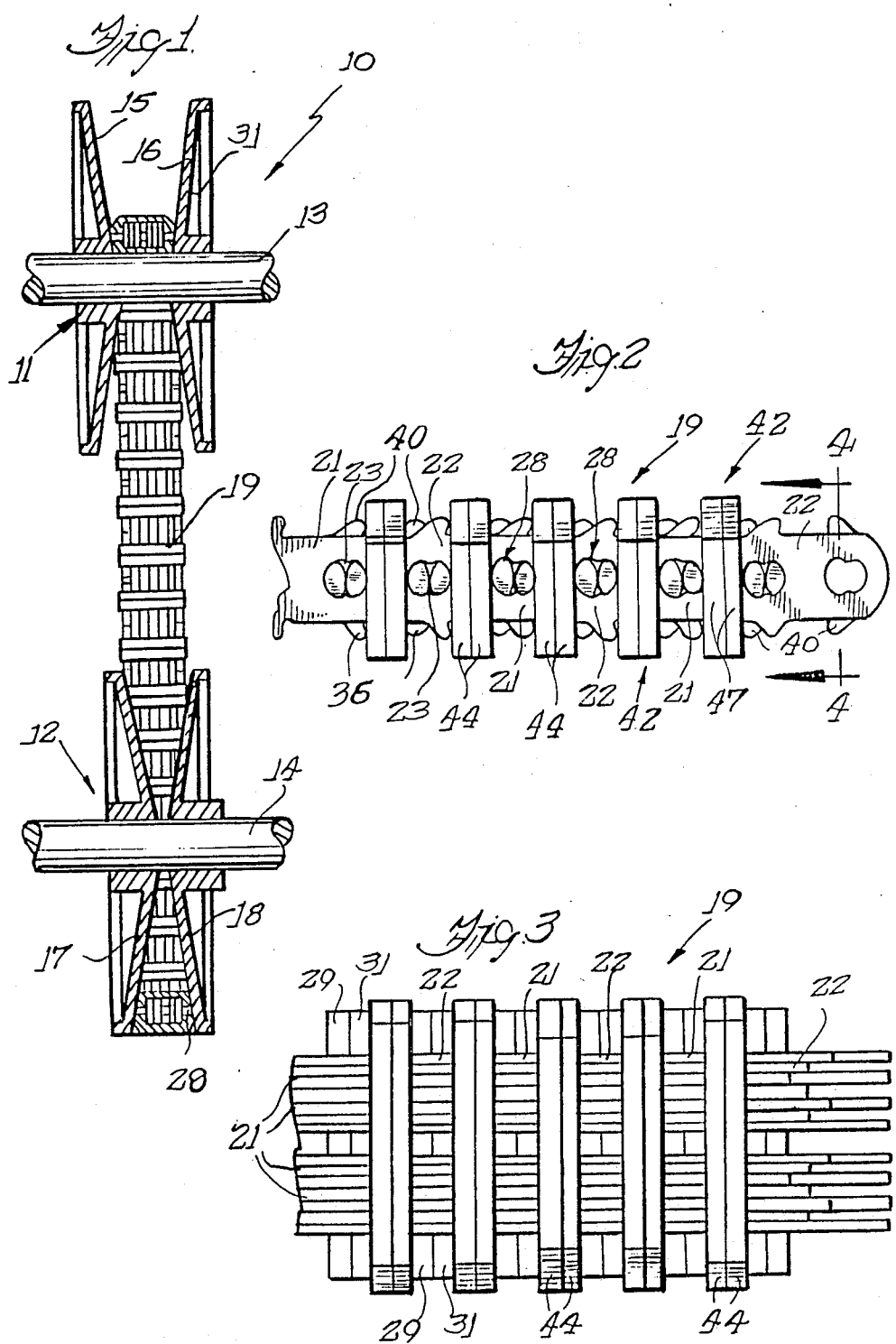

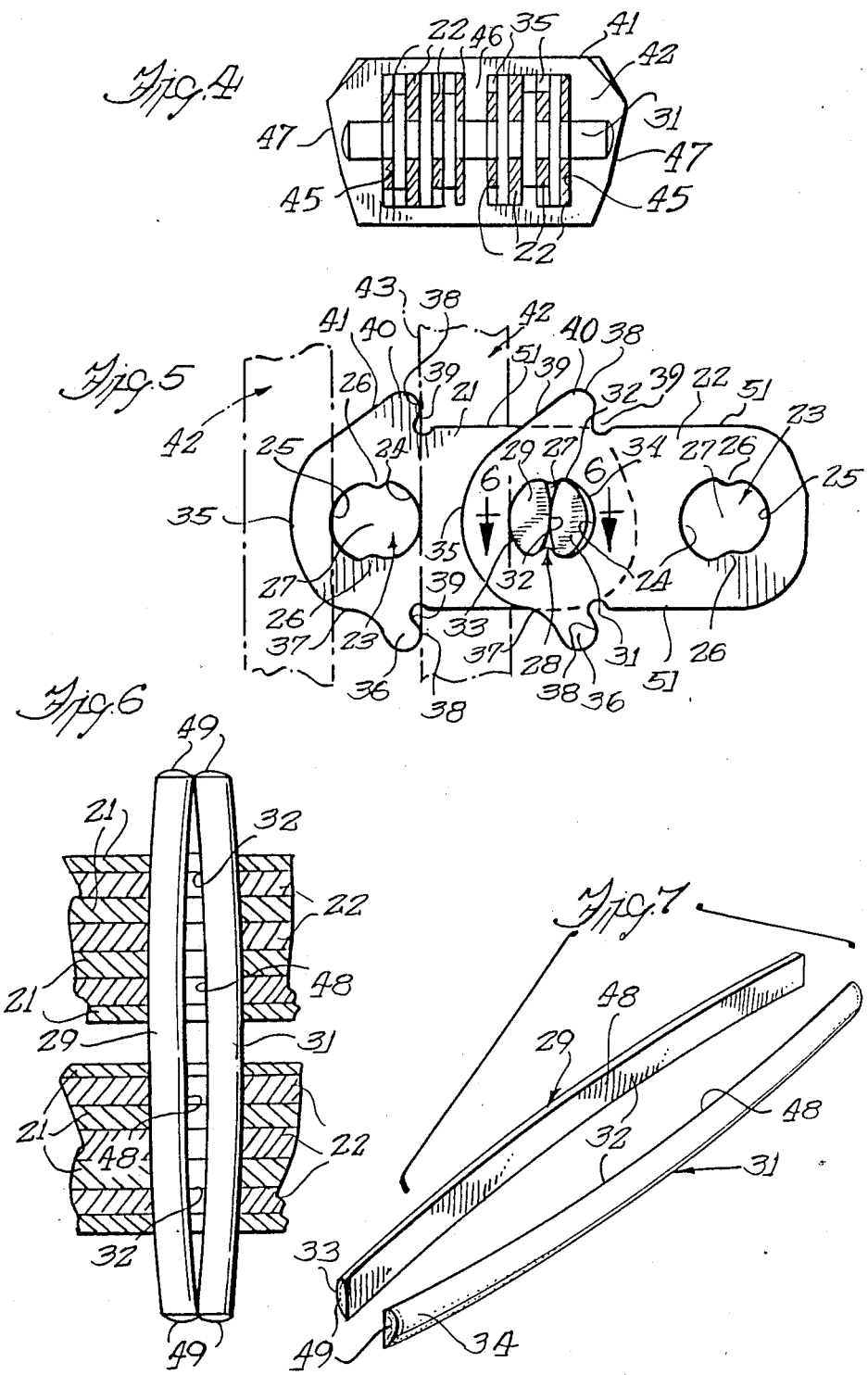

CAMBERED PIN CVT CHAIN BELT

This application is a continuation of application Ser. No. 114,335, filed Oct. 28, 1987, now abandoned.

BACKGROUND OF THE INVENTION

The present invention relates to a chain belt, and more particularly to a pivot joint for articulation between adjacent sets of chain links in a chain-belt. Various types of pivot means have been utilized for the joining and articulation of chain links, such as cylindrical pivot pins, pin and rocker, etc. wherein the chain links are provided in sets that are interleaved together and have aligned apertures in the links that receive the pivot means. The chain links articulate as the chain wraps around a pulley or sprocket for the chain.

Chain links which are used for the manufacture of chain-belts, combining a chain and a plurality of load blocks, are especially suitable to provide a driving connection between a pair of pulleys, resulting in a variable ratio drive transmission. The load blocks are positioned on the chain between the spaced pivot means and have one or more windows therein receiving the chain links extending therethrough. The load blocks have tapered outer or end surfaces which engage the sheave faces of the pulleys to provide the driving engagement between the pulleys and the chain-belt.

For a single round pin as the pivot means, the ends of the pins could be headed or swaged beyond the outside or guide chain links at both ends of the pin or the guide links could have slightly smaller apertures to provide a force fit with the ends of the pin. In some forms of power transmission chain using a pair of similar pins or a pin and rocker, one of the pin members is longer than the other, and the shorter member is retained in position by guide links flanking the edges of the chain; the guide link having apertures only large enough to receive the longer of the pin members. Then the longer of the pins is press-fit or otherwise secured in the guide link aperture.

Another method of limiting lateral movement of the pins or pin and rocker pivot means is through the use of a locking clip or spring clip. For a locking clip, the ends of the pins or pin and rocker have grooves located slightly beyond the chain links, and a clip engages in the groove or grooves to retain the pins intact. Such a locking clip is shown in U.S. Pat. No. 3,939,721. Where a spring clip is used, a resilient retaining clip extends across the width of the chain with downturned ends that extend over the ends of the pins or pin and rocker and are bent inward below the pin ends as seen in FIG. 9 of U.S. Pat. No. 4,507,106. One problem with either locking clips or spring clips is that clips are difficult to assemble and are prone to breakage, leaving the pins free to move laterally in the link sets. The present invention overcomes the problems relative to retaining the pivot pins in a chain-belt without adding any additional structure thereto.

SUMMARY OF THE INVENTION

The present invention relates to a chain-belt comprising interleaved sets of a plurality of chain links having spaced apertures wherein the apertures of adjacent sets of links are laterally aligned to receive the pins of a joint for articulation of the chain. A small longitudinally extending camber is introduced into at least one of the pins which, when assembled, creates a spring load between the pins and links, which load is sufficient to retain the pins in their operative position during assembly and handling of the chain-belt. The use of the camber for the pins obviates the need for locking clips and a press fit between the pins and guide link is not necessary.

The present invention also relates to a chain-belt consisting of interleaved sets of chain links having spaced apertures for pivot means, wherein each link has a pair of oppositely disposed tabs adjacent one end of each link; the links in a lateral set having the tabs at alternating ends. Also, the spaced apertures in each link have a generally hour-glass shape with the pins received in the rounded ends of the apertures and the narrowed central portion located between the pins. The load blocks encircling the sets of links are located between adjacent tabs on the interleaved links; the tabs preventing undue rocking action by the load blocks and thus decreased wear on the edges of the links.

Another feature of the invention is the use of two reduced-width links in the outermost positions of a set of interleaved links, to save metal without sacrificing any torque-carrying capacity of the chain-belt.

Further objects are to provide a construction of maximum simplicity, efficiency economy and ease of assembly, and such further objects, advantages and capabilities as will later more fully appear and are inherently possessed thereby.

DESCRIPTION OF THE DRAWINGS

FIG. 1 is a cross sectional illustration of a variable ratio pulley transmission showing one speed ratio position, the pulleys being joined by a chain-belt embodying the present invention.

FIG. 2 is a side elevational view of a portion of the chain-belt connecting the pulleys in FIG. 1 and incorporating the rocker joint of the present invention.

FIG. 3 is a top plan view of a portion of the chain-belt of FIG. 2.

FIG. 4 is a cross sectional view of the chain-belt taken on the line 4—4 of FIG. 2.

FIG. 5 is an enlarged partial side elevational view with portions removed to show details of the chain links and rocker joint.

FIG. 6 is a horizontal cross sectional view through a portion of the chain-belt taken on line 6—6 of FIG. 5.

FIG. 7 is an enlarged perspective view of the cambered pins removed from the chain-belt.

DESCRIPTION OF THE PREFERRED EMBODIMENT

Referring more particularly to the disclosure in the drawings wherein is shown an illustrative embodiment of the present invention, FIG. 1 discloses a variable pulley transmission 10 comprising a pair of pulleys 11,12 mounted on shafts 13,14, respectively. Each pulley includes a pair of flanges 15,16 or 17,18 drivingly connected by a chain-belt 19. One of the shafts is a driving shaft and the other is a driven shaft, and at least one flange of each pulley is movable axially relative to the opposite flange of the pair to vary the spacing between the flanges and thus vary the drive ratio of the transmission.

FIGS. 2 through 6 illustrate the power transmission chain-belt 19 of FIG. 1 which is constructed of sets of links 21 that are interleaved with adjacent sets of links 22; each link 21 or 22 having a pair of spaced apertures 23,23. Each aperture 23 consists of a generally hour-glass shape having a pair of generally oppositely disposed rounded surfaces 24 and 25 separated by inward projections 26 forming a narrowed neck 27. The longitudinal axis of each aperture is rotated through approximately 4° from horizontal. The apertures in adjacent sets 21 and 22 of interleaved links are transversely aligned to receive pins forming an articulation or rocker joint 28 joining the adjacent sets of links and providing articulation therebetween. A rocker joint 28 comprises a pair of metal, generally D-shaped (in cross section) members or pins 29,31, each having a facing rocking surface 32 in contact with one another, and a pair of substantially semi-circular back surfaces 33, 34 respectively, which are generally conformably received in the link apertures 23. The rounded back surface 33 of pin 29 engages the surface 25 while the surface 34 of pin 31 is spaced from surface 24 of link 22 as seen in FIG. 5, and the rocking surfaces 32 contact at the aperture neck 27 so that the members can rock on each other. Likewise, surface 34 of pin 31 engages surface 25 of the aperture 23 in link 21, axially aligned with the above aperture of link 22, while surface 33 of pin 29 is spaced from the surface 24. This arrangement will be repeated in adjacent openings of links 21,22 with the chain in tension.

Each link 21 or 22 is provided with a pair of oppositely disposed tabs or ears 36,40 adjacent one rounded end 35 of the link and generally laterally aligned with the aperture 23 adjacent that end of the link. An inwardly curved lower surface 37 leads from the link end 35 to the lower tab 36 to terminate in a rounded end surface having a rearwardly facing flat surface 38 adapted to abut the side surface 43 of a load block 42. The tab is further provided with a rounded undercut surface 39 so arranged as to prevent interference with the assembly and operation of the load blocks thereon. An angularly inclined upper surface 41 extends from end 35 to upper tab 40, also terminating in a rounded end surface with a flat rear surface 38 and undercut corner 39.

Metal drive or load blocks 42 encompass the chain-belt 19 between adjacent rocker joints 28, each load block consisting of a one-piece member or constructed of a plurality of substantially identical block parts 44. Each load block 42 is of a generally trapezoidal shape, when viewed from the front, and may have a central "window" or opening to accommodate the sets of links, or two or three windows. In the illustrated embodiment block 42 includes a pair of windows 45 separated by a central strut 46 (FIG. 4) for receiving the chain-belt 19. Also, each block has oppositely disposed edges 47,47, which can be crowned or straight, acting to frictionally contact the correspondingly tapered flanges 15,16 and 17,18 of the pulleys, such as shown in FIG. 1.

FIGS. 4 through 6 more clearly disclose the links 21 and 22 of the chain-belt 19 and the rocker joints 28 extending through the apertures 23 of the interleaved links and projecting beyond the outermost links as seen in FIGS. 3, 4 and 6. One or both of the D-shaped pins 29 and 31 are slightly cambered, as at 48, along the longitudinal axis of the pin, the camber being exaggerated in FIGS. 6 and 7. If both pins are cambered, they are cambered in opposite directions. The cambered pins press against the rounded surfaces 25 of the link apertures 23 in alternating links 21 and 22 and are, therefore, self-retaining. Due to the camber, the outer ends 49 of the pins 29,31 bear against each other at the rocking surfaces 32. This load resulting from the camber is sufficient to retain the pins in operative position during handling and assembly. In operation of the transmission, the chain tension acts to flatten out the pins against each other and provide full rocking face contact.

Although the cambering of the pins eliminates the use of spring or locking clips to retain the pins in position in handling of the chain-belt, the pins may shift laterally during belt operation so as to contact the pulley flange faces. To reduce any damage to the pulley flanges, the ends 49 of the pins may be rounded or radiused. That the pins contacted the pulley faces was evidenced by slight wear on the flange surfaces and/or polishing of the ends of the pins. Also, the tabs 35 and 40 on the links 21 and 22 prevent tipping or rocking of the load blocks 42 on the chain, especially during articulation. Also, the curved surfaces 37 of tabs 36 allow the load blocks and links to rotate and articulate as the chain is wrapped around a pulley. With substantial elimination of rocking of the load blocks, wear on the upper and lower edges 51 of the links is substantially reduced, resulting in a much longer life for the chain. The undercuts 39 on the tabs obviates any interference of the corners of the load blocks with the links for ease of assembly on the chain.

Another aspect of the invention is the use of ranks or sets of links in which the outermost two links in each set of links is different, that is, have a width substantially less than the width of the other links in the same set or rank. FIG. 6 shows that the outermost links of the ranks 21 are approximately one-half the width of the interior links. Because the outside links carry less load than the remaining inside links 21, it is possible to decrease the width and thus save the amount of metal for a chain, without diminishing the torque-carrying capacity of the total chain-belt.

I claim:

1. In a power transmission chain-belt constructed of a plurality of sets of links interleaved with adjacent sets of links, each link having a pair of longitudinally spaced apertures, the apertures of one set of links being transversely aligned with the apertures of an adjacent set of links, and a pair of pivot members in each aligned set of apertures, the improvement comprising the pivot members including pins having opposite ends and being identical in cross section but with one reversed relative to the other to provide facing rocking surfaces, at least one of said pins being longitudinally cambered to retain the pivot members in the link sets.

2. A power transmission chain-belt as set forth in claim 1, wherein said sets of links each have a pair of oppositely disposed outermost links and the pins are cambered in opposite directions and project beyond the outermost links.

3. A power transmission chain-belt as set forth in claim 1 wherein said sets of links each have a pair of oppositely disposed outermost links and said pins engage at their rocking faces at the ends beyond the outermost links.

4. A power transmission chain-belt as set forth in claim 1, wherein said chain-belt drivingly connects a pair of pulleys having opposite flanges, and said pins are engageable at their ends with said flanges.

5. A power transmission chain-belt as set forth in claim 1, wherein said camber of the pins separates the rocking faces at their central portions when the chain-belt is unloaded and is fully taken up during belt operation.

6. A power transmission chain-belt as set forth in claim 1, including at least one link having an elongated body with a pair of longitudinally spaced apertures adjacent the opposite ends of the links, each aperture having a generally hour-glass shape with enlarged rounded ends joined by an intermediate neck portion, said enlarged rounded ends adapted to receive a pin therein.

7. A power transmission chain-belt as set forth in claim 6, wherein each pin has a rounded back surface and each aperture has a complementary rounded surface cooperating with the pin surface to prevent relative rotation therebetween.

8. A power transmission chain-belt as set forth in claim 1, in which said sets of links each have inner links between a pair of outermost links, at least one of said sets of links having its two outermost links of a width substantially less than the width of the inner links between those two outermost links.

9. A power transmission chain-belt for driving connection between a driving pulley member and a driven pulley member, said members having convergent pulley flanges, said chain-belt comprising: a plurality of connected sets of links interleaved with adjacent sets of links, each link having a pair of longitudinally spaced apertures, the apertures of one set of links being transversely aligned with the apertures of an adjacent set of links; generally cylindrical pivot means disposed in each of said aligned apertures to provide driving interconnection between said adjacent sets of links; load block means shaped to receive said sets of links, at least one load block means being transversely disposed on each of said sets of links and extending generally parallel to the adjacent pivot means, said load block means having pulley flange engaging surfaces spaced apart a predetermined distance, said pivot means having a length such that both ends thereof cannot contact the respective pulley flanges simultaneously and said pulley flanges urge said pin means toward a central position in said chain-belt upon any contact therewith.

10. The power transmission chain-belt of claim 9 wherein each of said pivot means is frictionally retained with the associated aligned apertures.

11. The power transmission chain-belt of claim 10 wherein said pivot means is slightly non-cylindrical to provide frictional retention within said associated aligned apertures.

12. The power transmission chain-belt of claim 10 wherein said pivot means comprises a pair of coextensive pins, at least one of which has a camber whereby central portions of said pins are separated and resiliently engage said set of links within said associated apertures.

13. The power transmission chain-belt of claim 12 wherein said pins have opposed ends which are in contact and have facing rocking surfaces.

14. The power transmission chain-belt of claim 13 wherein said pins of said pivot means have substantially the same camber.

15. The power transmission chain-belt of claim 12 wherein said camber separates the central portions of said rocking surfaces when said chain-belt is unloaded; said camber is fully taken up during operation of said chain-belt on said pulley members.

16. The power transmission chain-belt of claim 12 wherein the cross section of said pins is defined by two rounded convex surfaces, the engaging surfaces of said pins of each pivot means comprising rocking faces.

17. The power transmission chain-belt of claim 16 wherein said apertures are generally hour-glass shaped to define two pin retaining areas, said pins being retained in respective pin retaining areas for rocking articulation.

18. The power transmission chain-belt of claim 16 wherein said pins engage at their rocking faces at ends beyond the outermost links.

19. The power transmission chain-belt of claim 9 wherein said sets of links have a pair of outermost links and said pin means extends beyond said outermost links.

20. The power transmission chain-belt of claim 9 wherein each of said sets of links comprises a plurality of substantially identical overlying inner links between a pair of oppositely disposed outermost links, said outermost links of a width substantially less than the width of said inner links between said outermost links.

21. The power transmission chain-belt of claim 9 wherein said load block means has a plurality of windows defined by intermediate webs to receive a plurality of links, said windows being separated by said webs.

22. The power transmission chain-belt of claim 9 wherein said pulley flange engaging surfaces define a frustoconical surface on said flanges, said pivot means being positioned to engage said surface in the event said pivot means shifts from said central position.

23. The power transmission chain-belt of claim 9 wherein said sets of links are spaced a set distance from said flange engaging surfaces and the length of said pivot means is greater than the thickness of said interleaved lengths plus said set distance of said links from said flange engaging surfaces but less than said thickness plus two times said set distance.

24. A power transmission chain-belt for driving connection between driving and driven pulley members having convergent faces comprising:
a plurality of sets of links interleaved with other adjacent sets of links, each link having a pair of longitudinally spaced apertures, the apertures of one set of links being transversely aligned with the apertures of an adjacent set of links;
load block means engaging each set of links, the load block means being oriented generally transversely with respect to the links and having end surfaces adapted to engage the faces of the pulley members; and
generally oval pivot members positioned in the aligned apertures to provide interconnection between the adjacent sets of links, the pivot members having a length such that both end surfaces thereof do not simultaneously contact opposing faces of the pulley members, the faces and pivot members being oriented such that the faces can contact the end surfaces of the pivot members to urge the pivot members toward a predetermined position in the chain-belt upon contact with the faces, the pivot members not otherwise being positively mechanically held in position in the apertures.

25. The chain-belt of claim 24 wherein the aligned apertures are adapted to receive a pair of pivot members therein, at least one of the pair of pivot members having a predetermined amount of camber to provide frictional engagement with the associated links sufficient to restrict the transverse movement of the pivot members within the apertures.

26. The chain-belt of claim 25 wherein both of the pair of pivot members have a predetermined amount of camber.

27. The chain-belt of claim 26 wherein the pair of pivot members are oriented such that the central portions of such pivot members are spaced apart when the chain-belt is not under load.

28. A power transmission chain-belt for driving connection between driving and driven pulley members having convergent faces comprising:
   a plurality of sets of links interleaved with other adjacent sets of links, each link having a pair of longitudinally spaced apertures, the apertures of one set of links being transversely aligned with the apertures of an adjacent set of links;
   load block means engaging each set of links, the load block means being oriented generally transversely with respect to the links and having end surface adapted to engage the faces of the pulley members; and
   generally oval pivot members positioned in the aligned apertures to provide interconnection between the adjacent sets of links, the pivot members having a length such that both end surfaces thereof do not simultaneously contact opposing faces of the pulley members, the faces and pivot members being oriented such that the faces can contact the end surfaces of the pivot members to urge the pivot members toward a predetermined position in the chain-belt upon contact with the faces, the pivot members not being positively mechanically fastened to the chain-belt.

29. The chain-belt of claim 28 wherein the aligned apertures are adapted to receive a pair of pivot members therein, at least one of the pair of pivot members having a predetermined amount of camber to provide frictional engagement with the associated links sufficient to retain the pivot members in operative position in the aligned apertures during handling and assembly.

30. The chain-belt of claim 29 wherein both of the pair of pivot members have a predetermined amount of camber and have rounded end surfaces.

31. The chain-belt of claim 30 wherein the pair of pivot members are oriented such that the central portions of such pivot members are spaced apart when the chain-belt is not under load and yet flatten sufficiently under load to provide substantially fully rocking contact therebetween.

32. A power transmission chain-belt comprising: a plurality of sets of links interleaved with adjacent sets of links, said sets of links each having a plurality of inner links between a pair of oppositely disposed outermost links; each link having a pair of longitudinally spaced apertures, the apertures of one set of links being transversely aligned with the apertures of an adjacent set of links and having a generally hour-glass shape with enlarged rounded ends joined by an intermediate neck portion; a pair of pivot members in each aligned set of apertures, said pivot members including generally D-shaped pins having opposite ends and being identical in cross section, said D-shapes of said pins being positioned with one reversed to the other to provide facing rocking surfaces, said enlarged rounded ends of the apertures adapted to receive a pin therein, each pin having a convex rounded back surface and each aperture having a complementary rounded surface cooperating with the pin surface to prevent relative rotation, said pins being oppositely cambered to separate the central portions of the rocking surfaces when the chain-belt is unloaded, said camber being fully taken up during chain-belt operation, said pins engaging at their rocking faces at the ends thereof projecting beyond the set of links.

33. The power transmission chain-belt of claim 32 wherein the rocking surfaces of said pins contact at said intermediate neck portion of said aperture.

34. The power transmission chain-belt of claim 32 wherein at least one of said link sets has its two outermost links of a width substantially less than the width of the inner links between those outermost links.

35. The power transmission chain-belt of claim 34 wherein said chain-belt drivingly connects a pair of pulleys having opposite flanges, said pin ends projecting beyond the outermost links being rounded to engage the surfaces of said pulleys.

36. A power transmission chain-belt for transferring drive between a pair of pulleys, each pulley having opposed flanges, the chain-belt comprising
   sets of links, each link defining a pair of spaced, generally hour-glassed shaped apertures and a pair of oppositely disposed tabs adjacent one end of the link;
   a plurality of load blocks, each block defining a pair of central windows encircling the central portion of a link set, the load block outer edges contacting the pulley flanges as the chain belt articulates, and the link tabs preventing rocking of the load blocks during articulation;
   the apertures of one set of links being transversely aligned with the apertures of an adjacent set of links; and,
   a pair of elongated pins, generally D-shaped in cross section, positioned in each aligned set of apertures, each pin being slightly cambered along the longitudinal pin axis, the camber of each pin in a pair of pins being opposite to the camber of the other pin in that pair, the camber providing a load sufficient to retain the pin pairs in an operative position during assembly and subsequent handling of the chain-belt, with the tension produced in operation of the chain-belt around the pulleys acting to flatten out the pins in each pair against each other, thus providing full rocking face contact between the pins in each pair.

* * * * *